E. G. BUDD.
FRAME JOINT.
APPLICATION FILED AUG. 20, 1907.
923,810.
Patented June 8, 1909.
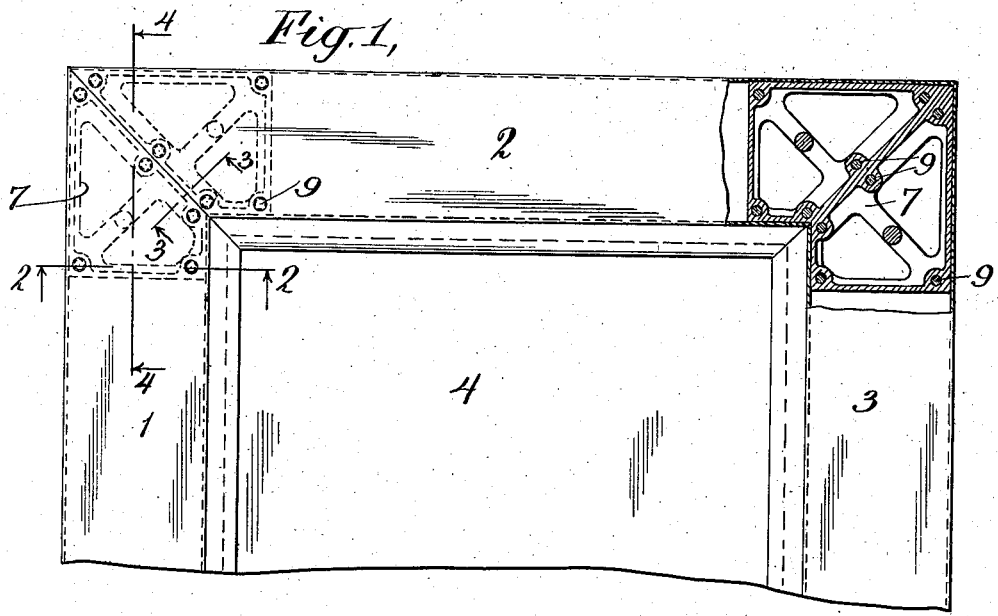
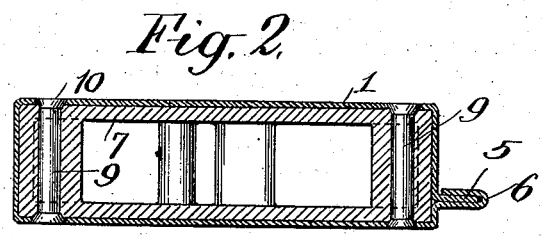
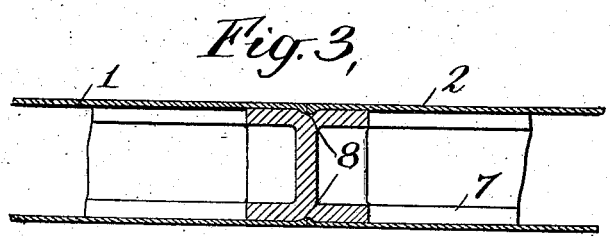
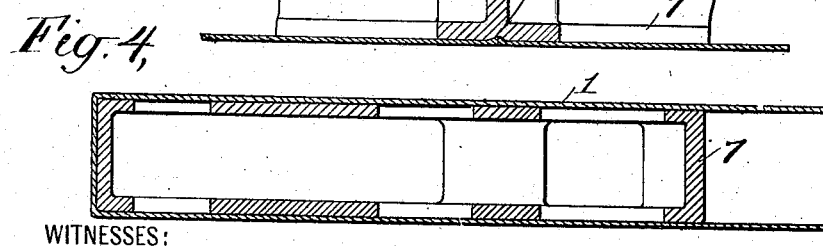
WITNESSES
INVENTOR
Edward G. Budd
BY
ATTORNEY

UNITED STATES PATENT OFFICE.

EDWARD G. BUDD, OF PHILADELPHIA, PENNSYLVANIA, ASSIGNOR TO HALE-KILBURN METAL COMPANY, OF PHILADELPHIA, PENNSYLVANIA, A CORPORATION OF PENNSYLVANIA.

FRAME-JOINT.

No. 923,810.  Specification of Letters Patent.  Patented June 8, 1909.

Application filed August 20, 1907. Serial No. 389,326.

*To all whom it may concern:*

Be it known that I, EDWARD G. BUDD, a citizen of the United States, residing at Philadelphia, in the county of Philadelphia and State of Pennsylvania, have invented a new and useful Improvement in Frame-Joints, of which the following is a specification.—

This invention relates to the construction of joints in metallic frames and has reference more particularly to the construction of joints in frames and sashes for windows and doors.

The object of the invention is to effect certain improvements in the construction of such metallic frames to the end that a structure is produced possessing ample strength, which is of attractive appearance and may be manufactured at comparatively low cost.

In frames for windows and doors constructed of sheet-metal, it is highly desirable that the frame be of uniform thickness throughout and that the lines of the joints between abutting parts do not show on the exterior of the frame. The joints must be so constructed, however, that these desirable features are attained without a sacrifice of the strength of the structure as a whole. Such window and door frames usually consist of frame-members secured together at their ends, each consisting of one or more strips of sheet-metal pressed to the desired cross-sectional shape and to provide open space between opposite sides thereof, whereby greater strength is secured.

In accordance with my invention, the adjacent ends of two frame-members are secured together by employing a corner-box or spacer extending within the ends of the members, welding or otherwise securing the abutting ends of the two members together and, preferably, riveting the ends of the members to the corner-box or spacer. The corner-box is preferably finished to fit tightly within the ends of the frame-members and is specially formed to facilitate the operation of securing the parts together. Also, the heads of the rivets preferably lie in countersunk openings in the members and after being upset are riveted thereto. By this method of joining the frame-members, two adjacent members have their ends firmly united, there is no unevenness in the thickness of the frame at or about the joint and the line of the joint does not show.

The preferred embodiment of the invention is illustrated in the accompanying drawings, in which—

Figure 1 is an elevation of a portion of a door broken away and sectioned in part, and Figs. 2, 3 and 4 are detail views in section on lines 2—2, 3—3 and 4—4, respectively, of Fig. 1.

Referring to these drawings, Fig. 1 shows a portion of a door consisting of rails or frame-members 1, 2 and 3, and a panel 4, but I wish it understood that my improvements in the frame construction are equally applicable to frames or sashes for windows. Each of the frame-members consists of one or more strips of sheet-metal pressed to the proper form, so as to provide a rectangular cross-section and an inwardly extending flange, to which latter the panel 4 is secured. In the construction illustrated in the drawings, each frame-member consists of a single strip of sheet-metal pressed to a rectangular cross-section as shown in Fig. 2 and to provide a flange 5 at one of the lateral edges and a fold 6 at the other lateral edge, the latter inclosing flange 5 and forming therewith a flange extending inwardly of the frame. The ends of adjacent frame-members to be secured together are mitered off, as shown in Fig. 1. At each corner of the frame, a corner-box or spacer 7 is provided, consisting of a metallic casting. This corner-box is shaped so as to extend a short distance into the end of each of the two abutting frame-members and is preferably shaped as shown in Fig. 1. It is accurately finished, so that its thickness is exactly equal to the width of the opening in the frame-member, and thus it not only strengthens the corner of the frame but also provides finished surfaces, against which the sides of the rails may be held securely by clamps during the process of uniting the ends of the rails. These corner-boxes prevent buckling of the metal of the frame-members during this operation to a very large extent, and should some slight buckling take place this can be readily removed by hammering the plates down against the surface of the corner-box, using for this purpose a suitable flattening hammer. The corner-box 7 is preferably hollow, so that it is of comparatively light weight, and is provided with a number of openings therethrough for a purpose hereinafter to be described. Directly underlying the line of the joint between the two frame-members, the corner-box 7 is provided with a depression or groove, as shown in cross-section in Fig. 3.

In securing the two adjacent frame-members together, the corner-box 7 is positioned as shown in Fig. 1 and the abutting edges of the two frame-members are welded together so that they form a unitary structure. In the operation of welding, the edges of the two frame-members are brought to a high heat and molten metal is supplied along the line of the joint. The edges are thus united entirely around the frame. After the metal has cooled, a considerable portion of the surplus metal at the joint is driven down into the groove 8 in the corner-box 7, as by means of a flattening hammer, and the remainder of the metal projecting above the surface of the frame may be filed off so as to leave a perfectly flat outer surface and make the frame of uniform thickness throughout. This being done, rivets 9 are inserted through openings in the frame-members and the corner-box, and their ends 10 are upset in countersunk openings in the frame-members. Preferably the heads 10 of the rivets 9 are not turned over enough to give a very tight fit, since this would be apt to buckle the metal somewhat, and after being turned over these heads are heated so as to effect a weld between them and the metal of the frame-members. After the metal has cooled, the surplus metal of the heads 10 may be filed off, so that the heads of the rivets are flush with the surface of the frame-members.

Although the mitering of the ends of the frame-members is preferred, this is by no means essential, as the line of the joint between the frame-members may be differently disposed, if desired. The groove in the corner-box 7 underlying the line of the joint affords important advantages; it allows room for the metal to flow during the welding operation, so as to insure a joint of greater thickness than the body of the rail. Also, the groove serves to facilitate the welding, as the heat is not transmitted by the metal of the corner-box as rapidly as it would be if the surface of the corner-box lay directly under the abutting edges of the frame-members. Moreover, the groove in the corner-box permits of obtaining a greater thickness of metal along the line of the weld, whereby greater strength is obtained, as a portion of the surplus metal may be driven into this groove after the weld is made, instead of being filed off. It will be seen that by this means the frame-members are firmly united at their ends and this joining of the members is effected without increasing the thickness of the frame at any point and without leaving a line showing where the joint between the members is made.

Having now described my invention, what I claim as new therein and desire to secure by Letters Patent is as follows:—

1. A frame consisting of hollow frame-members of pressed sheet-metal having their ends secured together and a metallic corner-box within the frame underlying the joint, the material of said frame-members being thickened at said joint, substantially as set forth.

2. The combination of two hollow metallic frame-members and a metallic corner-box extending within the ends of said members, said box having a groove therein underlying the ends of said members and said ends being secured together, substantially as set forth.

3. The combination of two frame-members formed of sheet-metal strips pressed to a rectangular cross-section and having mitered ends, and a metallic corner-box extending within the ends of said members and having a groove therein underlying said ends, said ends being welded together and the material of said members on the interior thereof entering said groove and on the exterior having a plane surface, substantially as set forth.

4. The combination of two hollow frame-members of pressed sheet-metal having their ends secured together, a metallic corner-box within the frame underlying the joint, the material of said frame-members being thickened at the joint, and means for securing the frame-members to the corner-box, substantially as set forth.

5. The combination of two hollow frame-members of pressed sheet-metal, a metallic corner-box extending within the ends of the members, said box having a groove therein underlying the ends of said members and said ends being secured together, and means for securing each of said ends to said box, substantially as set forth.

6. The combination of two hollow frame-members formed of pressed sheet-metal having their ends abutting, a metallic corner-box extending within the ends of said members, and means for securing said members to said corner-box, said means being welded to said frame-members, substantially as set forth.

7. The combination of two frame-members consisting of sheet-metal strips pressed to rectangular cross-section and mitered at their ends, a metallic corner-box extending within the ends of the members and having a plurality of openings therethrough, and rivets extending through said openings and having their heads welded to said frame-members, substantially as set forth.

8. The combination of two frame-members consisting of sheet-metal strips pressed to a rectangular cross-section, a metallic corner-box extending within the ends of said members, said ends being welded together, and a plurality of rivets extending through openings in said corner-box and having their ends welded to said frame-members, substantially as set forth.

9. The combination of two frame-members consisting of sheet-metal strips pressed to a rectangular cross-section and having mitered ends, a metallic corner-box extending within the ends of said members and having a groove therein underlying the joint between them, said ends being welded together and the material of the weld entering said groove, and a plurality of rivets extending through openings in said corner-box and having their ends welded to said frame-members, substantially as set forth.

This specification signed and witnessed this 18th day of July, 1907.

EDWARD G. BUDD.

Witnesses:
R. M. FRIES,
P. N. TUCKER.